United States Patent
Ikemoto et al.

(10) Patent No.: US 6,397,699 B1
(45) Date of Patent: Jun. 4, 2002

(54) OSCILLATING ACTUATOR

(75) Inventors: Masaya Ikemoto, Yokohama; Kiyokazu Nakamura, Nagoya; Michiyoshi Matsumoto, Nagoya; Shingo Fujino, Nagoya; Hiroyuki Sato, Yokohama, all of (JP)

(73) Assignees: Nagase & Co., Ltd., Osaka; Toray Industries Inc., Tokyo, both of (JP)

( * ) Notice: Subject to any disclaimer, the term of this patent is extended or adjusted under 35 U.S.C. 154(b) by 0 days.

(21) Appl. No.: 09/587,332

(22) Filed: Jun. 5, 2000

(30) Foreign Application Priority Data

Nov. 2, 1999 (JP) ............................................. 11-312883

(51) Int. Cl.[7] ............................................. G11B 21/02
(52) U.S. Cl. .................................. 74/490.01; 360/244.2
(58) Field of Search ................... 74/490.01; 360/78.12, 360/265.8, 265.9, 266, 266.1, 266.3, 244.9, 244.2

(56) References Cited

U.S. PATENT DOCUMENTS

| | | | | |
|---|---|---|---|---|
| 5,050,026 A | * | 9/1991 | Goss .................... | 360/265.8 X |
| 5,656,877 A | * | 8/1997 | Loubier ............... | 360/266.1 X |
| 5,812,342 A | * | 9/1998 | Khan et al. .............. | 360/244.9 |
| 5,815,348 A | * | 9/1998 | Danielson et al. ....... | 360/244.9 |
| 5,828,521 A | * | 10/1998 | Hasegawa ................ | 360/266.1 |
| 5,850,319 A | * | 12/1998 | Tangren .................... | 360/244.9 |
| 6,034,851 A | * | 3/2000 | Zarouri et al. ........ | 360/266.3 X |

FOREIGN PATENT DOCUMENTS

| | | |
|---|---|---|
| EP | 771 001 A | 5/1997 |
| JP | 8-306141 A | 11/1996 |
| JP | 8-336854 A | 12/1996 |
| JP | 9-161418 | * 6/1997 |
| JP | 11-206094 | * 7/1999 |

* cited by examiner

*Primary Examiner*—Rodney H Bonck
(74) *Attorney, Agent, or Firm*—Frishauf, Holtz, Goodman, Langer & Chick, P.C.

(57) ABSTRACT

An oscillating actuator is provided which includes a coil-holding member, and a carriage member. The carriage member has a bearing hole and at least one arm, and the at least one arm has a head portion and an intermediate portion arranged between the head portion and the bearing hole. In addition, a thickness of the intermediate portion in a normal direction, perpendicular to a width of the carriage member, is smaller than a thickness of the head portion in the normal direction. The oscillating actuator having this structure exhibits excellent dimensional stability when used in a disk apparatus, and can be produced easily and economically.

15 Claims, 6 Drawing Sheets

—PRIOR ART—

OSCILLATING ACTUATOR

BACKGROUND OF THE INVENTION

1. Field of the Invention

The present invention relates to an oscillating actuator, and more particularly to an oscillating actuator for disk apparatuses such as a hard disk or magnetic disk apparatus which exhibits excellent dimensional stability and can be produced easily and economically.

2. Description of Related Art

Figure 8:
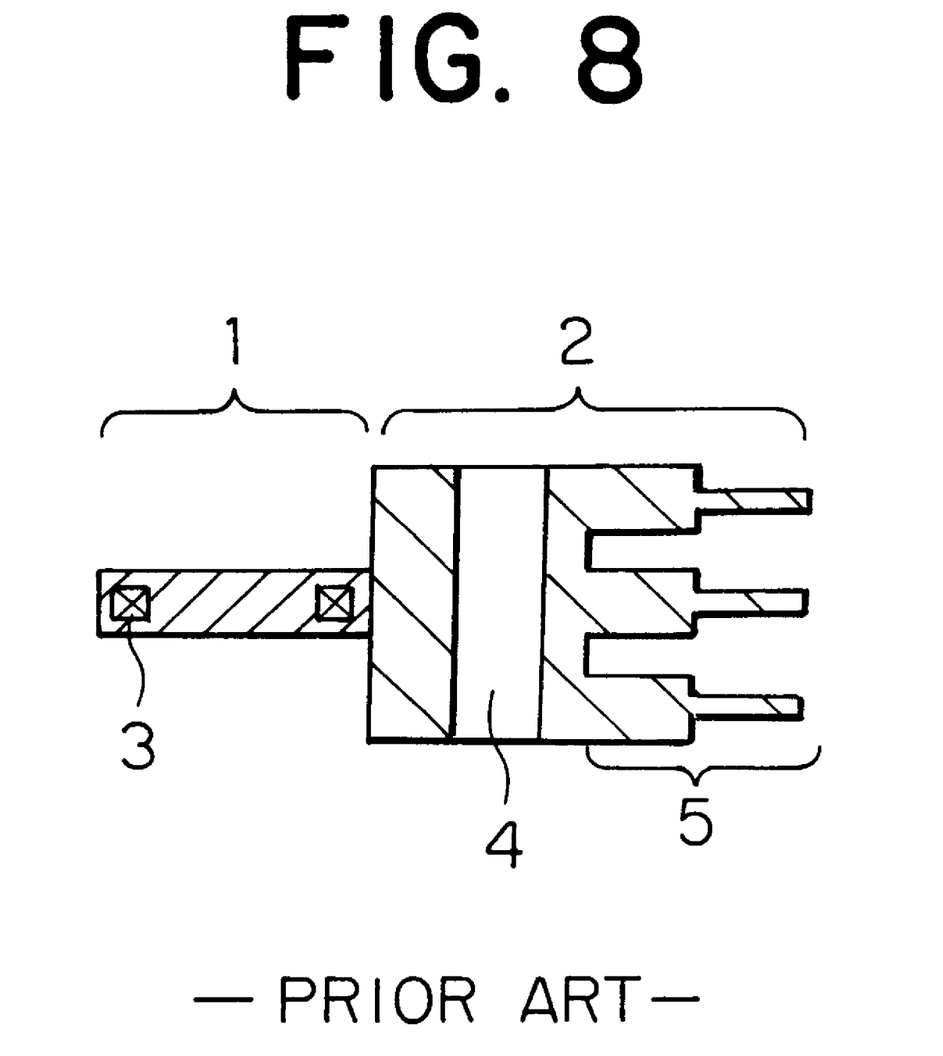
FIG. 8 shows a sectional view of an example of a conventional oscillating actuator.

Actuators heretofore used for disk apparatuses generally comprise, as shown in FIG. 8, a carriage member 2 having a multi-layer structure having a plurality of arms 5 and a movable coil 3 which is held by a coil-holding member 1 and oscillates the carriage member around a bearing hole 4. A head suspension in which a functional member such as a magnetic head (a magnetic sensor) or the like is disposed is to be attached to the tip portion of each arm. The movable coil is a coil prepared by winding an electrically conductive wire coated with an electrically insulating film. When an electric current is passed through the coil, driving force works on the coil by the effect of a magnetic circuit having a permanent magnet (not shown in the figure) and the carriage member oscillates around the bearing hole.

Heretofore, the carriage member is made of a metal material such as an aluminum alloy from the standpoint of strength and workability. However, production of the carriage member made of a metal material such as an aluminum alloy requires many working steps for shaping and cutting. Therefore, the production cost is high and productivity is poor.

Recently, due to the requirement for increasing the recording density of magnetic disks and decreasing the access time, lighter oscillating actuators are desired to further improve precision and speed of positioning of oscillating actuators. Thus, oscillating actuators having arms made of a resin have been developed.

For example, in Japanese Patent Application Laid-Open No. Heisei 8(1996)-306141, as the arm made of a resin which can be produced at a low cost and shows excellent dimensional stability and mechanical properties, an arm which has a metal member having a penetrating hole for attaching a head suspension at the tip portion and formed from a thermoplastic resin integrally in combination with the metal part in accordance with injection molding has been proposed. However, the arm having the member made of a resin has a problem in that deformation such as camber tends to take place due to difference in the rate of solidification between surface portions and inner portions.

In Japanese Patent Application Laid-Open No. Heisei 8(1996)-336854, as the process for producing an arm having excellent dimensional stability using a resin at a smaller cost, a process is proposed in which an intermediate product having a connecting portion made of a resin, which is to be cut off or removed, between arm parts is prepared in accordance with injection molding and the connecting portion made of a resin is cut off from the prepared intermediate product after the intermediate product has been solidified sufficiently. However, in accordance with this process, it takes a longer time for the production due to the necessity for removing the connecting portion made of a resin and this process is disadvantageous with respect to productivity. Moreover, it is difficult to produce a carriage having a precision sufficient for precision instruments such as disk apparatuses.

SUMMARY OF THE INVENTION

An object of the present invention is to provide an oscillating actuator for disk apparatuses such as a hard disk or magnetic disk apparatus which exhibits excellent dimensional stability and can be produced easily and economically.

As the result of intensive studies by the present inventors to overcome the above problems, it was found that deformation (camber) of an arm during production of a carriage member can be prevented when an arm of a carriage member has an intermediate portion and a head portion arranged in this order from a bearing hole in the carriage member and the intermediate portion has a thickness smaller than a thickness of the head portion and dimensional stability of the product can be improved. The present invention has been completed based on this knowledge.

The present invention provides:

(1) An oscillating actuator which includes a coil-holding member and a carriage member including a bearing hole and one or more arms, wherein the arm has an intermediate portion and a head portion arranged in this order from the bearing hole in the carriage member and the intermediate portion has a thickness smaller than a thickness of the head portion;

(2) An oscillating actuator described in (1), wherein the carriage member is integrally formed from an electrically conductive resin;

(3) An oscillating actuator described in (1), wherein the carriage member is a laminate in which arm pieces and spacers are alternately disposed and are made of an electrically conductive resin;

(4) An oscillating actuator described in (1), wherein the arm has a plurality of protrusions which are disposed on side faces of the arm alternately at upper and lower positions and used for containing lead wires;

(5) An oscillating actuator described in (1), wherein grooves extending from the head portion toward the bearing hole are formed on a face of the arm;

(6) An oscillating actuator described in (1), wherein ribs extending from the head portion toward the bearing hole are formed on a face of the arm; and (7) An oscillating actuator described in (6), wherein second ribs are formed on a face of the arm in a direction perpendicular to the ribs extending from the head portion toward the bearing hole.

Preferable embodiments of the present invention include:

(8) An oscillating actuator described in (1), wherein the arm has a base portion at a position close to the bearing hole in the carriage member and the base portion has a thickness greater than a thickness of the intermediate portion;

(9) An oscillating actuator described in (1), wherein the thickness of the intermediate portion is about 50 to about 80% of the thickness of the head portion;

(10) An oscillating actuator described in any of (2) and (3), wherein the electrically conductive resin includes a thermoplastic resin and carbon fiber; and (11) An oscillating actuator described in (10), wherein the content of the carbon fiber is about 10 to about 100 parts by weight based on 100 parts by weight of the thermoplastic resin.

BRIEF DESCRIPTION OF THE DRAWINGS

FIG. 1(*a*) shows a plan view of an embodiment of the oscillating actuator of the present invention.

The numbers in the above figures have the following meanings:

1: A coil-holding member
2: A carriage member
3: A movable coil
4: A bearing hole
5: An arm
6: An intermediate portion
7: A head portion
8: A base portion
9: A line of start of a decrease in the thickness
10: An arm piece
11: A spacer
12: A concave hole
13: A protruding boss
14: A protrusion
15: A penetrating hole
16: A fixing structure
17: A groove
18: A rib
19: A second rib

DESCRIPTION OF THE PREFERRED EMBODIMENTS

Figure 1A:
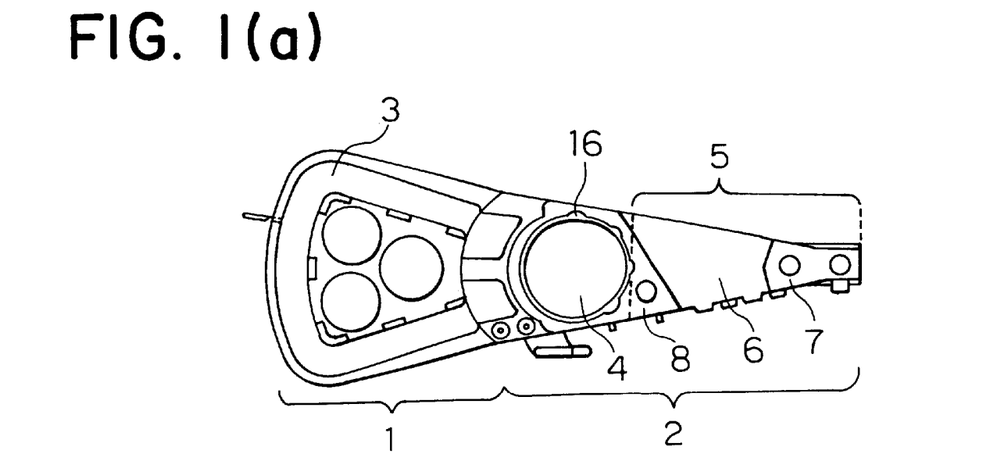
Figure 1B:
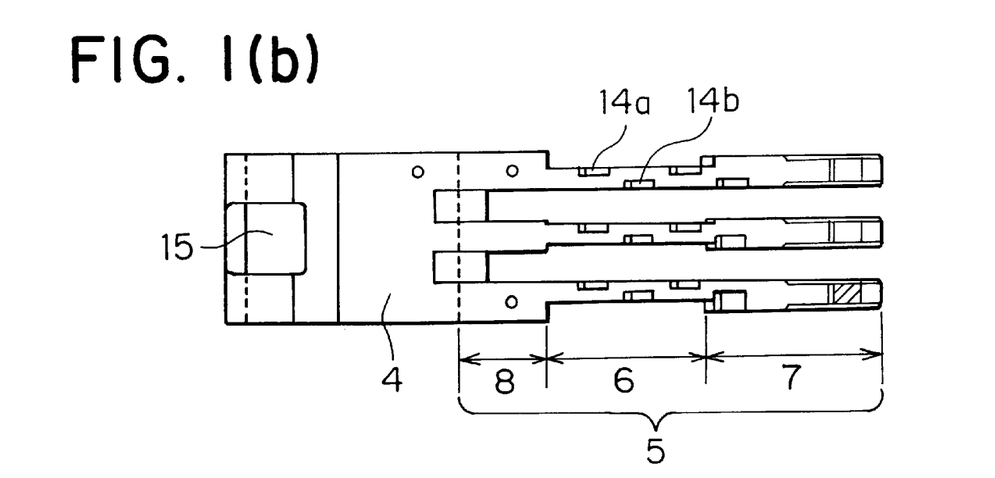
FIG. 1(b) shows a side view of an embodiment of the carriage member of the oscillating actuator of the present invention.

The oscillating actuator of the present invention includes a coil-holding member and a carriage member including a bearing hole and one or more arms. The arm has an intermediate portion and a head portion arranged in this order from the bearing hole in the carriage member and the intermediate portion has a smaller thickness than the thickness of the head portion. FIG. 1(a) shows a plan view of an embodiment of the oscillating actuator of the present invention and FIG. 1(b) shows a side view of an embodiment of the carriage member of the oscillating actuator. The oscillating actuator of the present invention includes a coil-holding member 1 and a carriage member 2. In this embodiment, the coil-holding member has a structure in which a coil 3 for providing driving power to the oscillating actuator is embedded inside a resin. The coil used in the present invention is not particularly limited. For example, an air-core coil prepared by winding a melt-adhesive wire composed of a lead wire having a melt-adhesive coating film as the outermost layer of a core wire around a prescribed core of a wire-winding jig in prescribed number of rounds while being treated with heated air may be used.

The carriage member of the present embodiment includes a bearing hole 4 into which a rotating shaft for oscillating the oscillating actuator is inserted and an arm 5. The arm has an intermediate portion 6 and a head portion 7 for attaching a functional member such as a magnetic head which are arranged in this order from the bearing hole in the carriage member. In the oscillating actuator of the present invention, it is preferable that the carriage member has 1 to 5 arms. As shown in FIG. 1(b), in the arm of the oscillating actuator of the present invention, the thickness of the intermediate portion 6 is smaller than one of the head portion 7. The thickness of the head portion is not particularly limited. It is preferable that the thickness of the head portion is about 1 to about 3 mm. When the thickness of the head portion is smaller than 1 mm, there is the possibility that strength is insufficient for attaching the functional member. When the thickness of the head portion exceeds 3 mm, there is the possibility that the thickness of the disk apparatus becomes exceedingly great. The difference in the thickness between the intermediate portion and the head portion is not particularly limited. It is preferable that the thickness of the intermediate portion is about to about 50 to about 80% and more preferably about 60 to about 70% of the thickness of the head portion. When the thickness of the intermediate portion is less than 50% of the thickness of the head portion, there is the possibility that rigidity and strength of the arm is insufficient. When the thickness of the intermediate portion exceeds 80% of the thickness of the head portion, there is the possibility that deformation (camber) of the arm takes place.

Due to the decreased thickness of the intermediate portion, difference in the rate of solidification of a resin between surface portions and inner portions of the intermediate portion during molding decreases and deformation (camber) of the intermediate portion of the arm in the production of the carriage member can be prevented. Thus, the oscillating actuator showing very excellent dimensional stability can be obtained. The time required for solidification of the resin during the production of the carriage member decreases and the productivity can be improved by the decrease in the time of production.

In the arm of the oscillating actuator of the present invention, a base portion 8 having a greater thickness than the thickness of the intermediate portion may be formed at a position close to the bearing hole 4 as shown in FIGS. 1(a) and 1(b). The thickness of the base portion is not particularly limited. It is preferable that the thickness of the base portion is about the same as one of the head portion. Due to the base portion having the thickness greater than the thickness of the intermediate portion and formed at a position close to the bearing hole, rigidity and strength of the arm can be increased. When the carriage member has a plurality of arms, the base portion may be formed in all arms or in some of the arms alone. For example, when a carriage member has three arms, base portion may be formed in two outer arms and no base portion may be formed in the arm in the middle.

Figure 2A:
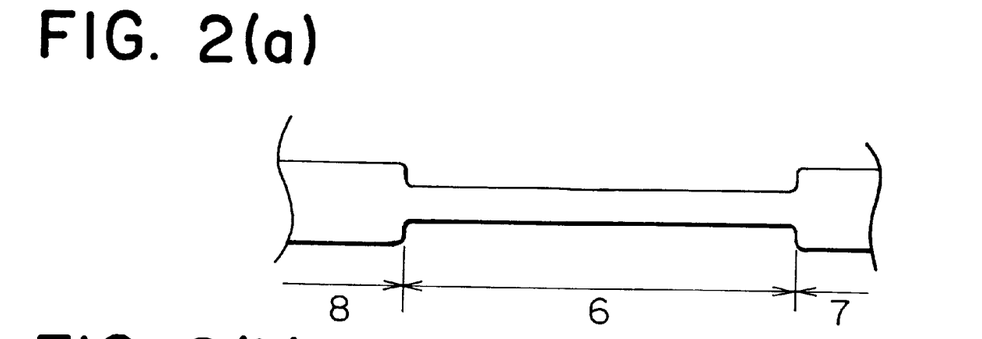
FIG. 2(a) shows a partial side view of an embodiment of the arm.
Figure 2B:
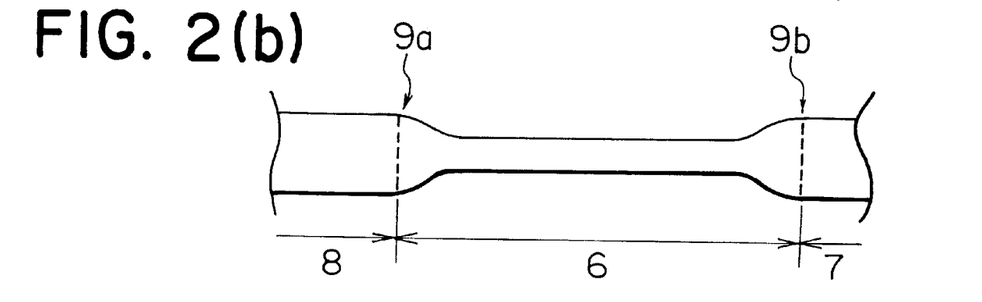
FIG. 2(b) shows a partial side view of another embodiment of the arm.

In the oscillating actuator of the present invention, the shape of the boundary of the intermediate portion and the head portion or the shape of boundary of the intermediate portion and the base portion is not particularly limited. For example, as shown in FIG. 1(b), the shapes may be formed from intersections of two planes or, as shown in FIG. 2(a), the shapes may be rounded at the corners. Alternatively, as shown in FIG. 2(b), the shape may be formed from smooth slopes having one end at the line 9a where the thickness starts to decrease from that of the head portion 7 and the other end at the line 9b where the thickness starts to decrease from that of the base portion 8. The shape of the boundary of the intermediate portion and the head portion and the shape of boundary of the intermediate portion and the base portion may be the same with or different from each other.

In the oscillating actuator of the present invention, the carriage member can be produced integrally in accordance with the injection molding using an electrically conductive resin. In the injection molding of the carriage member, it is preferable that a gate of a mold is formed at a position around the head portion or close to the bearing hole. It is also preferable that the temperature of the mold is set at a relatively low temperature and the injection molding is conducted at a relatively small injecting pressure. By integrally molding the carriage member, the carriage member can be produced rapidly and productivity can be improved.

Figure 3:
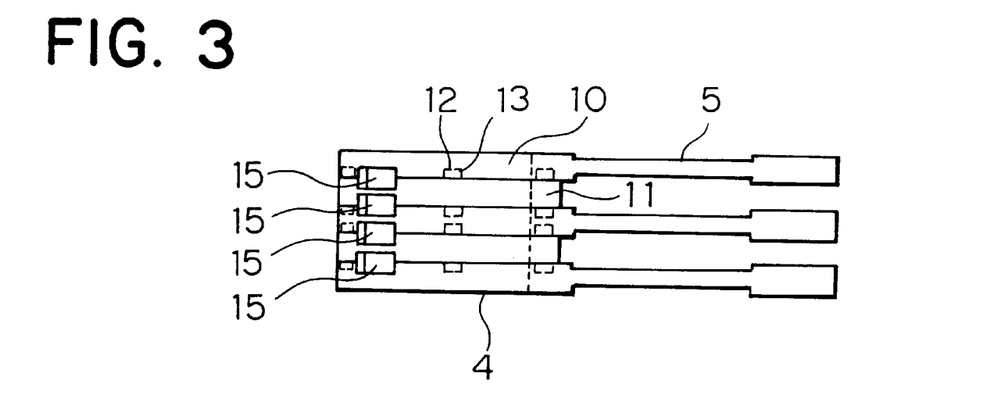
FIG. 3 shows a side view of an embodiment of the carriage member.
Figure 4A:
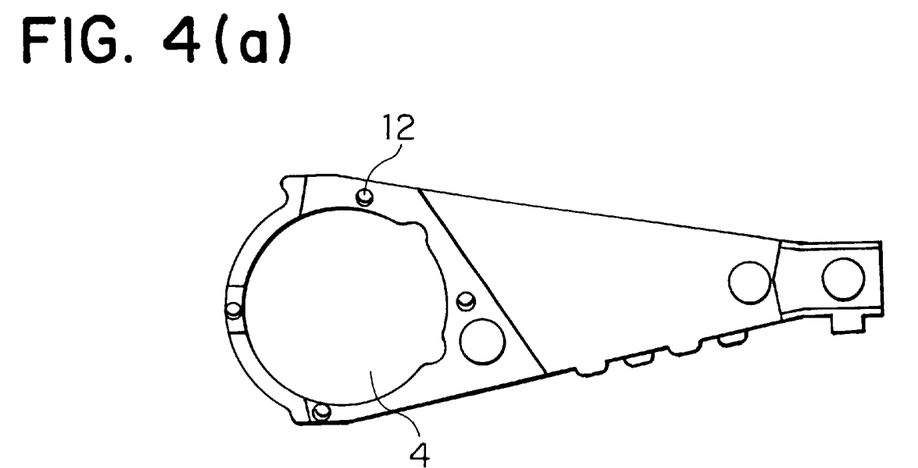
FIG. 4(a) shows a plan view of an embodiment of the arm piece
Figure 4B:
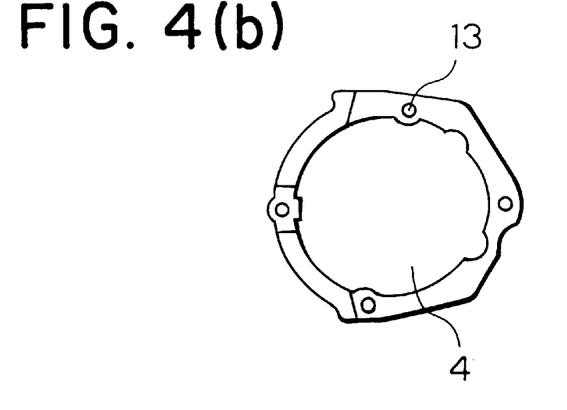
FIG. 4(b) shows a plan view of an embodiment of the spacer.

In the oscillating actuator of the present invention, the carriage member can be produced by separately molding arm pieces and spacers which are made of an electrically conductive resin and disposing the molded arm pieces and spacers alternately to form a laminate. FIG. 3 shows a side view of an embodiment of the carriage member used in the present invention. The carriage member of the present embodiment is a laminate in which arm pieces 10 and spacers 11 are alternately disposed. FIG. 4(a) shows a plan view of the arm piece and FIG. 4(b) shows a plan view of the spacer. In the present embodiment, a plurality of concave holes 12 are formed in the peripheral portions of the bearing hole 4 of the arm piece 10 and a plurality of protruded bosses 13 are formed in the peripheral portions of the bearing hole 4 of the spacer 11. The arm piece and the spacer can be laminated together by fitting the protruding bosses into the concave holes. The height of the protruding boss is about one half or less of the thickness of the outer edge of the bearing hole of the arm piece. Alternatively, protruded bosses may be formed on the arm piece and concave holes may be formed on the spacer. An arm having less deformation (camber) can be obtained due to separately molding of the arm pieces. The positions of the arm pieces and the spacers can be held with stability due to the lamination of arm pieces and spacers using concave holes and protruded bosses which can be fitted together. When the arm pieces and the spacers are laminated by the fitting, the arm pieces and the spacers may be adhered together using an adhesive.

In the oscillating actuator of the present invention, it is preferable that the carriage member is made of an electrically conductive resin. When the carriage member is made of an electrically conductive resin, electrostatic charge is not formed in the carriage member and adverse effects of electrostatic charge on functional members attached to the tip of the arm can be prevented. The electrically conductive resin is not particularly limited. It is preferable that the electrically conductive resin is a thermoplastic resin containing carbon fiber and has a volume inherent resistivity of about 10 to about $10^5$ $\Omega \cdot cm$ and more preferably about $10^2$ to about $10^4$ $\Omega \cdot cm$. When the resin has a volume inherent resistivity smaller than 10 $\Omega \cdot cm$, the amount of carbon fiber mixed with the resin increases and there is the possibility that moldability deteriorates. When the resin has a volume inherent resistivity exceeding $10^5 \Omega \cdot cm$, there is the possibility that the adverse effects of electrostatic charge arise.

In the present invention, the thermoplastic resin used for the electrically conductive resin is not particularly limited. Examples of the thermoplastic resin include polyamide resin such as nylon, polyacetal resins, polycarbonate resins, modified polyphenylene ether resins, polyester resins such as polyethylene terephthalate and polybutylene terephthalate, polyphenylenesulfide resins, polysulfone resins, polyether ketone resins such as polyether ether ketone, entirely aromatic polyester resins such as polyarylate, ABS resins, polyolefin resins such as reinforced polypropylene, thermotropic liquid crystal polymers and polyether imides. The thermoplastic resins may be used singly or as a combination of two or more. Among these resins, polyphenylenesulfide resins and thermotropic liquid crystal polymers are preferably used.

In the present invention, the carbon fiber used for the electrically conductive resin is not particularly limited. For example, any of polyacrylonitrile carbon fibers and pitch carbon fibers may be used. Any of a high strength type, a high modulus type and an ultra-high modulus type may be used. The carbon fibers may be used singly or as a combination of two or more. Due to the carbon fiber incorporated into the thermoplastic resin, the resin is provided not only with the electric conductivity but also with mechanical strength and rigidity. The content of carbon fiber is not particularly limited. It is preferable that the content of carbon fiber is about 10 to about 100 parts by weight and more preferably about 20 to about 70 parts by weight based on 100 parts by weight of the thermoplastic resin. When the content of carbon fiber is less than 10 parts by weight based on 100 parts by weight of the thermoplastic resin, there is the possibility that the electric conductivity of the resin is insufficient. When the content of carbon fiber exceeds 100 parts by weight based on 100 parts by weight of the thermoplastic resin, there is the possibility that moldability of the resin deteriorates.

In the oscillating actuator of the present invention, it is preferable that, as shown in FIG. 1(b), the arm of the carriage member has a plurality of protrusions 14a and 14b which are disposed on side faces of the arm alternately at upper and lower positions, respectively. Due to the plurality of protrusions which are disposed on side faces of the arm alternately at upper and lower positions, lead wires transmitting signals from the functional member can be contained between the protrusions 14a and 14b which are disposed on side faces of the arm alternately at upper and lower positions, respectively, and the lead wires can be fixed tightly without sag.

In the carriage member used in the present invention, it is preferable that, as shown in FIG. 1, a penetrating hole 15 is formed in the portion of the carriage member at the side of the bearing hole contacting the coil-holding member and a fixing structure 16 is formed on the side wall of the bearing hole. The shape of the fixing structure is not particularly limited. For example, protrusions or grooves may be formed on the side wall of the bearing hole as the fixing structure. Because the penetrating hole and the fixing structures are formed on the bearing hole, the resin forming the coil-holding member is pushed into the bearing hole through the penetrating hole when the coil-holding member connected to the carriage member is prepared by molding and the resin fills the fixing structure to form the cylindrical shape for inserting a rotating shaft. Thus, strength of connection of the coil-holding member to the carriage member increases and these members can be connected together with sufficient strength.

Figure 5:
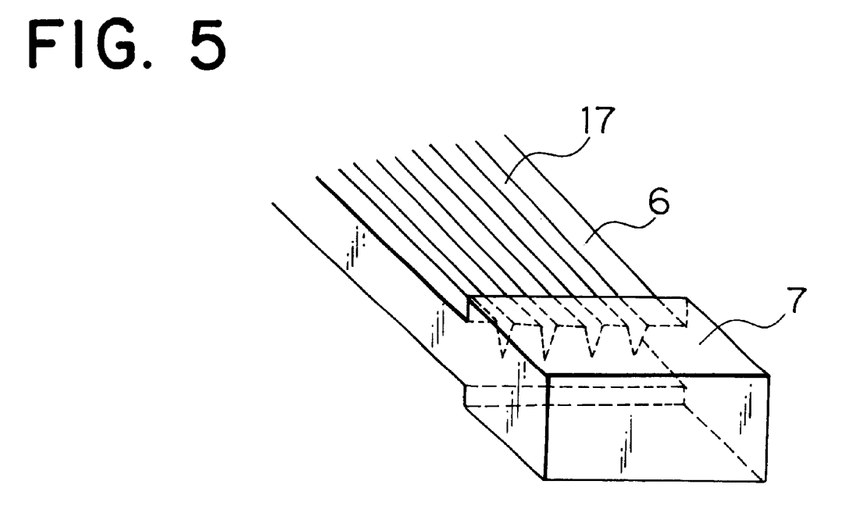
FIG. 5 shows a partial perspective view of an embodiment of the arm of the carriage member.

In the oscillating actuator of the present invention, grooves extending from the head portion toward the bearing hole may be formed on the face of the arm of the carriage member. FIG. 5 shows a partial perspective view of an embodiment of the arm of the carriage member used in the present invention. In this embodiment, grooves 17 extending from the head portion 7 toward the bearing hole are formed on the intermediate portion 6 of the arm. The number of the groove is not particularly limited. A single groove or a plurality of grooves may be formed. The grooves may be formed on one face of the arm as shown in FIG. 5 or may be formed on both upper and lower faces of the arm. Due to the presence of the grooves extending from the head portion toward the bearing hole, rigidity against force applied in the direction perpendicular to the plane of the arm can be enhanced. Therefore, deformation (camber) of the arm of the carriage member after the oscillating actuator has been produced can be prevented. Deformation (camber) of the arm can be prevented even when the temperature of the disk apparatus is raised by operation of the apparatus.

Figure 6:
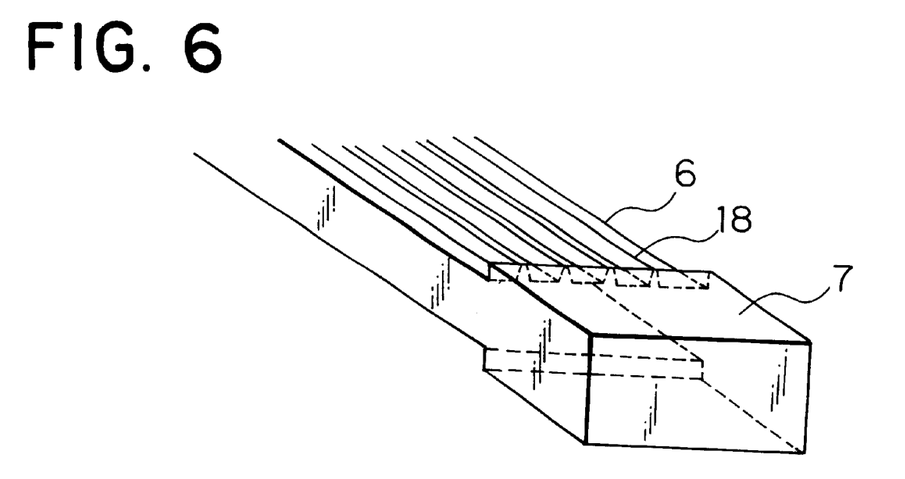
FIG. 6 shows a partial perspective view of another embodiment of the arm of the carriage member.

In the oscillating actuator of the present invention, ribs extending from the head portion toward the bearing hole may be formed on the face of the arm of the carriage member. FIG. 6 shows a partial perspective view of another embodiment of the arm of the carriage member used in the present invention. In this embodiment, ribs 18 extending from the head portion 7 toward the bearing hole are formed on the intermediate portion 6 of the arm. The number of the rib is not particularly limited. A single rib or a plurality of ribs may be formed. The ribs may be formed on one face of the arm as shown in FIG. 6 or may be formed on both upper and lower faces of the arm. Due to the presence of the ribs extending from the head portion toward the bearing hole, rigidity against force applied in the direction perpendicular to the plane of the arm can be enhanced. Therefore, deformation (camber) of the arm of the carriage member after the oscillating actuator has been produced can be prevented. Deformation (camber) of the arm can be prevented even when the temperature of the disk apparatus is raised by operation of the apparatus.

Figure 7:
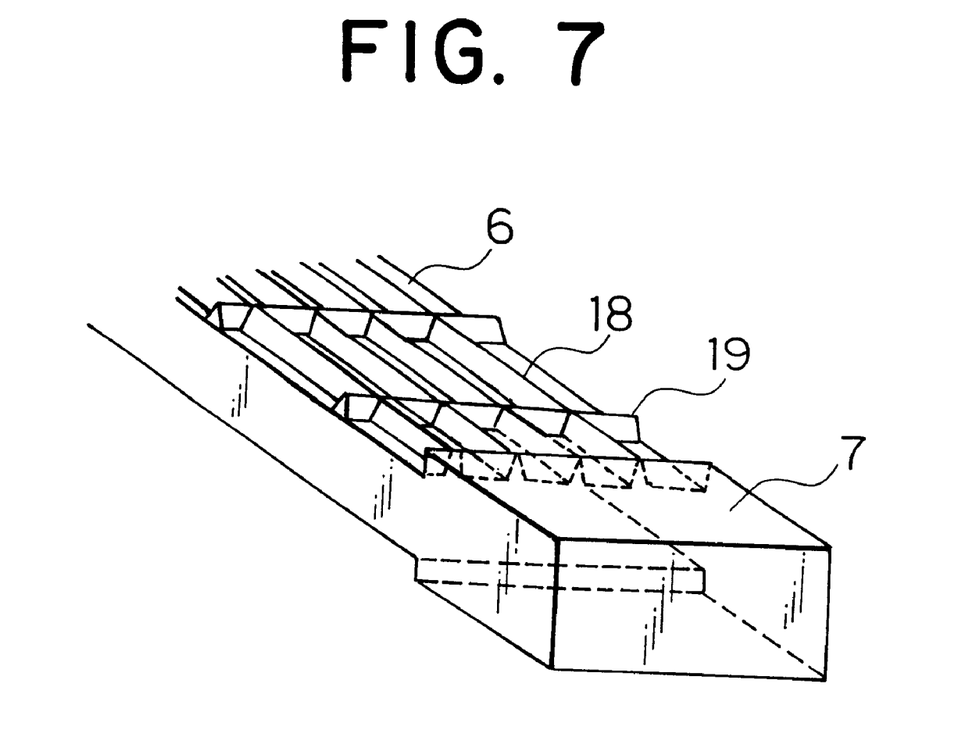
FIG. 7 shows a partial perspective view of another embodiment of the arm of the carriage member.

In the oscillating actuator of the present invention, in addition to the above ribs extending from the head portion toward the bearing hole, second ribs intersecting the former ribs in the direction perpendicular to the former ribs may be formed on the face of the arm of the carriage member. FIG. 7 shows a partial perspective view of another embodiment of the arm of the carriage member used in the present invention. In this embodiment, ribs 18 extending from the head portion 7 toward the bearing hole are formed on the intermediate portion 6 of the arm and second ribs 19 intersecting the former ribs in the direction perpendicular to the former ribs are also formed. Neither the number of the rib extending from the head portion to the bearing portion nor the number of the second rib is particularly limited. With respect to both types of ribs, a single rib or a plurality of ribs may be formed. The ribs may be formed on one face of the arm as shown in FIG. 7 or may be formed on both upper and lower faces of the arm. Due to the presence of the ribs extending from the head portion toward the bearing hole and the second ribs intersecting the former ribs in the direction perpendicular to the former ribs, rigidity against force applied in the direction perpendicular to the plane of the arm can be enhanced. Therefore, deformation (camber) of the arm of the carriage member after the oscillating actuator has been produced can be prevented. Deformation (camber) of the arm can be prevented even when the temperature of the disk apparatus is raised by operation of the apparatus.

The process for producing the oscillating actuator of the present invention is not particularly limited. For example, the actuator can be produced in accordance with a process in which the carriage member is prepared by injection molding, the movable coil is prepared by winding a lead wire coated with an electrically insulating film and connecting the starting end portion and the finishing end portion of the lead wire to terminal pins, the carriage member and the movable coil are placed at prescribed positions in a mold for the oscillating actuator and the mold is filled with any of synthetic resin for the coil-holding member by injection. It is preferable that the connection of the end portions of the lead wire of the movable coil to the terminal pins is conducted by spot welding. When the connection is conducted by soldering, the high temperature during the soldering causes problems and there is the possibility that disconnection occurs at portions around the portion connecting the lead wire to the terminal pins due to damages of the electrically insulating film coating the surface of the lead wire or damages of the core of the lead wire and that short-circuit occurs when electric current is passed through the coil due to scattered solder. These problems can be overcome by using spot welding. When the carriage member and the movable coil are placed at prescribed positions in the mold for the oscillating actuator and the mold is filled with the synthetic resin for the coil-holding member by injection, the outer peripheries and the inner peripheries of the movable coil are filled with the resin and the movable coil is embedded inside the resin. Thus, the position of the movable coil can be fixed with stability. The resin is pushed into the bearing hole through the penetrating hole in the carriage member and fills the fixing structure to form the cylindrical shape for inserting the rotating shaft. Therefore, the connecting strength of the coil-holding member and the carriage member is enhanced and, thus, these members can be strongly connected to each other. It is preferable that the injection molding for forming the coil-holding member is conducted at a relatively low pressure so that no excessive load is applied to the movable coil. It is preferable that the temperature of the mold for the oscillating actuator is relatively low. When the resin injected into and filling the mold for the oscillating actuator is cooled and solidified, the mold is opened and the produced oscillating actuator is taken out.

In the oscillating actuator of the present invention, it is preferable that the synthetic resin used for the coil-holding member is an electrically insulating resin having a volume inherent resistivity of about $10^5$ Ω·cm or greater. By forming the coil-holding member from the electrically insulating resin, short-circuit can be prevented when electric current is passed through the movable coil. The electrically insulating resin used for the coil-holding member is not particularly limited. Examples of the electrically insulating resin include polyamide resin such as nylon, polyacetal resins, polycarbonate resins, modified polyphenylene ether resins, polyester resins such as polyethylene terephthalate and polybutylene terephthalate, polyphenylenesulfide resins, polysulfone resins, polyether ketone resins such as polyether ether ketone, entirely aromatic polyester resins such as polyarylate, ABS resins, polyolefin resins such as reinforced polypropylene, thermotropic liquid crystal polymers and polyether imides. The electrically insulating resins may be used singly or as a combination of two or more. Among these resins, polyphenylene sulfide resins and thermotropic liquid crystal polymers are preferably used. In the present invention, electrically conductive fillers such as carbon fiber and electrically conductive carbon black may be added in order to provide the electrically insulating resin with the antistatic property.

In the present invention, a filler may be added to the electrically insulating resin forming the coil-holding member or to the electrically conductive resin forming the carriage member. By adding a filler to these resins, mechanical strength and rigidity of the resins can be improved. It is preferable that the amount of the filler is about 70 parts by weight or less based on 100 parts by weight of the resin. When the amount of the filler exceeds 70 parts by weight based on 100 parts by weight of the resin, there is the possibility that the resin becomes brittle. The filler added to the resin is not particularly limited. Any of fiber fillers and non-fiber fillers can be used. Examples of the fiber filler include glass fiber, potassium titanate wisker, zinc oxide wisker, aluminum oxide wisker, aramide fiber, alumina fiber, silicon carbide fiber, ceramic fibers, asbestos fiber, gypsum fiber and metal fibers. Examples of the non-fiber filler include silicates such as wollastonite, zeolite, cerussite, mica, talc, kaolin, clay, pyroferrite, bentnite, asbestos and alumina silicate; metal compounds such as alumina, silicon oxide, magnesium oxide, zirconium oxide, titanium oxide and iron oxide; carbonates such as calcium carbonate, magnesium carbonate and dolomite; sulfates such as calcium sulfate and barium sulfate; hydroxides such as calcium hydroxide, magnesium hydroxide and aluminum hydroxide; glass beads; ceramic beads; boron nitride; silicon carbide; graphite; carbon black; dolomite; and silica. Fillers having hollow structures may also be used. These fillers may be used singly or as a combination of two or more. Among these fillers, fiber fillers are preferably used. The fillers may also be used after being treated with a coupling agent such as isocyanate compounds, organic silane compounds, organic titanate compounds, organic borane compounds and epoxy compounds. By treating the filler with a coupling agent, improved mechanical strength can be obtained.

In the present invention, other additives may be added to the electrically insulating resin for forming the coil-holding member and to the electrically conductive resin for forming the carriage member. Examples of the other additive added to the resins include plasticizers such as polyalkylene oxide oligomer compounds, thioether compounds, ester compounds and organic phosphorus compounds, nucleating agents for crystallization such as talc, kaolin and organic phosphorus compounds, mold releases such as silicone compounds, long chain aliphatic ester compounds and long chain aliphatic amide compounds, antioxidants such as hindered phenol compounds and hindered amine compounds, lubricants such as calcium stearate and lithium stearate, heat stabilizers, ultraviolet light inhibitors, coloring agents, flame retardants and foaming agents.

To summarize the advantages of the present invention, in the oscillating actuator of the present invention, deformation (camber) of the arm of the carriage member made of a synthetic resin during production can be prevented and excellent dimensional stability is exhibited after being produced. Adoption of the carriage member made of a synthetic resin eliminates the necessity for a multi-step working which is required for conventional carriage members made of metals and productivity is remarkably improved.

What is claimed is:

1. An oscillating actuator comprising:
   a coil-holding member, and
   a carriage member comprising a bearing hole and at least one arm,
   wherein the at least one arm comprises a head portion, and an intermediate portion arranged between the head portion and the bearing hole, and
   wherein a thickness of the intermediate portion in a normal direction, perpendicular to a width of the carriage member, is smaller than a thickness of the head portion in the normal direction.

2. An oscillating actuator according to claim 1, wherein the carriage member is integrally formed from an electrically conductive resin.

3. An oscillating actuator according to claim 1, wherein the carriage member comprises a laminate in which arm pieces and spacers are alternately disposed, and wherein the arm pieces and spacers are made of an electrically conductive resin.

4. An oscillating actuator according to claim 1, wherein a plurality of protrusions are alternately disposed on side faces of the at least one arm at upper and lower positions, and wherein said protrusions are used for containing lead wires.

5. An oscillating actuator according to claim 1, wherein grooves extending from the head portion toward the bearing hole are formed on a face of the at least one arm.

6. An oscillating actuator according to claim 1, wherein first ribs extending from the head portion toward the bearing hole are formed on a face of the at least one arm.

7. An oscillating actuator according to claim 6, wherein second ribs are formed on a face of the at least one arm in a direction perpendicular to the first ribs.

8. An oscillating actuator according to claim 1, wherein the thickness of the head portion in the normal direction is about 1 to 3 mm.

9. An oscillating actuator according to claim 1, wherein the thickness of the intermediate portion in the normal direction is approximately 50 to 80% of the thickness of the head portion in the normal direction.

10. An oscillating actuator according to claim 1, wherein the thickness of the intermediate portion in the normal direction is approximately 60 to 70% of the thickness of the head portion in the normal direction.

11. An oscillating actuator according to claim 1, wherein the at least one arm also comprises a base portion formed at a position close to the bearing hole, before the intermediate portion and the head portion.

12. An oscillating actuator according to claim 11, wherein a thickness of the base portion in the normal direction is greater than the thickness of the intermediate portion in the normal direction.

13. An oscillating actuator according to claim 12, wherein the thickness of the base portion in the normal direction is about the same as the thickness of the head portion in the normal direction.

14. An oscillating actuator comprising:
    a coil-holding member, and
    a carriage member comprising a bearing hole and at least one arm,
    wherein the at least one arm comprises a head portion, and an intermediate portion arranged between the head portion and the bearing hole,
    wherein the intermediate portion has a thickness smaller than a thickness of the head portion, and
    wherein grooves extending from the head portion toward the bearing hole are formed on a face of the at least one arm.

15. An oscillating actuator comprising:
    a coil-holding member, and
    a carriage member comprising a bearing hole and at least one arm,
    wherein the at least one arm comprises a head portion, and an intermediate portion arranged between the head portion and the bearing hole,
    wherein the intermediate portion has a thickness smaller than a thickness of the head portion,
    wherein first ribs extending from the head portion toward the bearing hole are formed on a face of the at least one arm, and
    wherein second ribs are formed on a face of the at least one arm in a direction perpendicular to the first ribs.

* * * * *